(12) United States Patent
Déjean (10) Patent No.: US 8,719,700 B2
(45) Date of Patent: May 6, 2014

(54) MATCHING A PAGE LAYOUT FOR EACH PAGE OF A DOCUMENT TO A PAGE TEMPLATE CANDIDATE FROM A LIST OF PAGE LAYOUT CANDIDATES

(75) Inventor: Hervé Déjean, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 330 days.

(21) Appl. No.: 12/773,125

(22) Filed: May 4, 2010

(65) Prior Publication Data

US 2011/0276874 A1    Nov. 10, 2011

(51) Int. Cl.
*G06K 9/62* (2006.01)
(52) U.S. Cl.
USPC ............................. 715/243; 715/247; 382/209
(58) Field of Classification Search
None
See application file for complete search history.

(56) References Cited

U.S. PATENT DOCUMENTS

| 7,149,347 B1 * | 12/2006 | Wnek ............................. 382/159 |
| 2004/0013302 A1 | 1/2004 | Ma et al. |
| 2006/0104511 A1 * | 5/2006 | Guo et al. ...................... 382/176 |
| 2008/0002234 A1 * | 1/2008 | Corso et al. ................... 358/405 |

OTHER PUBLICATIONS

Henry S. Baird, "Background structure in document images", AT&T Bell Laboratories.
Thomas M. Breuel, "Two geometric algorithms for layout analysis", Xerox Palo Alto Research Center.
Lawrence O'Gorman, "The document spectrum for page layout analysis", IEEE Transactions on Pattern Analysis and Machine Intelligence, vol. 15, No. 11, Nov. 1993.
Koichi Kise, Motoi Iwata, and Keinosuke Matsumoto, "On the application of voronoi diagrams to page segmentation", Department of Computer and Systems Sciences, College of Engineering, Sakai, Osaka Prefecture University.
Faisal Shafait, Joost Van Beusekom, Daniel Keysers, and Thomas M. Breuel, "Structural mixes for statistical layout analysis", Image Understanding and Pattern Recognition Recognition Research Group, Kaiserslautern, Germany.
George Nagy, Sharad Seth, and Mahesh Viswanathan, "A prototype document image analysis system for technical journals", 1992 IEEE.
Christian K. Shin and David S. Doermann, "Classification of document page images based on visual similarity of layout structures", Language and media processing laboratory, University of Maryland.
K.Y Wong, R. G. Casey, and F. M. Wahl, "Document analysis system", IBM J. Res. Develop, vol. 26, No. 6, Nov. 1982.
Liangcai Gao, Zhi Tang, Ruiheng Qui, "A mixed approach to auto-detection of page body", SPIE Digital Library on May 5, 2010.

* cited by examiner

*Primary Examiner* — Stephen Hong
*Assistant Examiner* — Asher Kells
(74) *Attorney, Agent, or Firm* — Fay Sharpe LLP (57) ABSTRACT

A computer-implemented method and system for generation of page templates are provided. The method includes providing a document in computer memory. Using a computer processor, page elements within the document are identified and labeled. For each page of the document, a set of geometric relations between pairs of page elements co-occurring on the page is computed, and the set of geometric relations is associated with the page. The method also includes generating a set of page template candidates based at least in part on the computed geometric relations, selecting page templates from the set of page template candidates, and outputting the selected page templates.

20 Claims, 10 Drawing Sheets

PAGE TEMPLATE CANDIDATES

| PAGE COVERAGE (# PAGES) | SET OF GEOMETRICAL RELATIONS R GENERATED PER PAGE |
|---|---|
| 210 | [{'TA': {'header': ['XCentered', 20],, 'PN': ['Flush - Left', 18]}}, {'PN': {'header': ['YJustified', 100]}}] — 135 |
| 201 | [{'TA': {'header': ['XCentered'], 'PN': ['Flush-Right']}}, {'PN': {'header': ['YJustified']}}] |
| 22 | [{'TA': {'header': ['XCentered']}}] |
| 19 | [{'TA': {'header': ['XCentered']}}, {'PN': {'header': ['YJustified']}}] |
| 18 | [{'TA': {'PN': ['Flush - Right']}}] |
| 16 | [{'TA': {'PN': ['Flush - Right']}}, {'PN': {'header': ['YJustified']}}] |
| 12 | [{'TA': {'header': ['Flush - Left', 'XCentered']}}] |
| 10 | [{'TA': {'Title': ['XCentered']}}] |
| 10 | [{'TA': {'header': ['XCentered', 'Flush-Right']}}] |
| 10 | [{'TA': {'PN': ['Flush - Left']}}, {'PN': {'header': ['YJustified']}}] |
| 5 | [{'TA': {'PN': ['Flush - Left']}}] |

| | FROM FIG. 5A |
|---|---|
| 4 | [{'TA': {'PN': ['BOTTOM']}}] |
| 4 | [{'TA': {'header': ['XCentered'], 'PN': ['Flush-Right'], 'Title': ['XCentered']}}, {'PN': {'header': ['YJustified'], 'Title': ['YJustified']}}, {'header': {'Title': ['XJustified']}}, {'header': {'Title': ['YJustified']}}] |
| 4 | [{'TA': {'Title': ['XCentered', 'XCentered']}}] |
| 3 | [{'TA': {'Title': ['XCentered']}}, {'TA': {'PN': ['BOTTOM']}}] |
| 3 | [{'TA': {'PN': ['Flush - Right']}}, {'TA': {'PN': ['TOP']}}] |
| 3 | [{'TA': {'Title': ['XCentered', 'XCentered']}}, {'TA': {'PN': ['BOTTOM']}}] |
| 2 | [{'TA': {'PN': ['Flush - Right'], 'Title': ['XCentered']}}, {'TA': {'PN': ['BOTTOM']}}] |
| 2 | [{'TA': {'header': ['XCentered']}}, {'TA': {'header': ['TOP']}}] |
| 2 | [{'TA': {'Title': ['XCentered']}}, {'TA': {'PN': ['BOTTOM']}}, {'PN': {'Title': ['Flush-Right']}}] |
| 2 | [{'TA': {'header': ['XCentered'], 'PN': ['Flush-Right'], 'Title': ['Flush - Left']}}, {'PN': {'header': ['YJustified']}}] |

252 — SAMSON AND HIS EXPLOITS

Samson, father and mother preferred that he should take woman among the daughters of their own tribe, but Samson wished for the maid of the Philistines, said he, pleaseth me The parents, after coming to the conclusion that it was the will of the Lord, that he should marry the maid of the Philistines, consented.

Then went Samson down, and his father and his mother, to Timnath, and came " vineyards of Timnath, and, behold, a young lion roared against him (Samson). And the spirit of the Lord came mightily upon him, and he him (the lion) he would have a kill, and he had nothing in his This was Samson, first exploit, which he told not to any one, not even his father, or his mother.

He then continued on his way, and went down and talked with the woman, and she pleased him well.

And, after time, he returned to take her, and he turned aside to see the carcass of the lion, and behold, there was a swarm of bees, and honey, in the carcass of the "

Samson made feast at his wedding, which lasted for seven days. At this feast there were brought thirty companions to be with him, unto whom he said I will now put forth riddle unto " you, ye can certainly declare me, within the seven days of the feast and find out, then I will give you thirty sheets, and thirty changes of garments. But, ye cannot declare me, then shall ye give me thirty sheets, and thirty changes of garments. And they said unto him, forth thy riddle, that we may hear – And he answered them, Out of the eater came forth meat, and out of the strong came forth sweetness "

This riddle the thirty companions could not solve.

" And it came to pass, on the seventh day, that they said unto Samson wife Entice thy husband, that he may declare unto us the riddle.

She accordingly went to Samson, and told him that he could not love her if it were, he would tell her the answer to the riddle. After she had wept and entreated of him, he finally told her, and she gave the answer to the children of her people. And the men of the city said unto him, on the seventh day, before the sun went down, What sweeter than honey, and what stronger than a lion? "

Samson, " upon hearing, suspected how they managed to find out the answer, whereupon he said unto them: - ye had not ploughed with my heifer, ye had not found out my riddle "

FIG. 6

THE GENEALOLOGY OF CHEIST JESUS. 101 be the Son of God, in the sense in which these words are used, is a conclusion which can be acceptable to those only who believe in alleged historical narratives on no other ground than that they wish them to be true, and dare not call them into question.
 The Matthew narrator states that all the generations from Abraham to David are fourteen, from David until the carrying away into Babylon &re fourteen, and from the carrying away into Babylon unto Jesus are fourteen generations. Surely nothing can have a more mythological appearance than. But, when we confine our attention to the genealogy itself, we find that the generations in the third stage, including Jesus himself, amount to only thirteen. All attempts to get over this difficulty have been without success the genealogies and have always been, hard nuts for theologians to crack. Some of the early Christian fathers saw and they very wisely put an allegorical interpretation to them.
 Dr. South says, in Kitto Biblical Encyclopaedia
 Christ being Messiah depends upon being son of David and king of the Jews, that unless evinced the whole foundations of Christianity must and
 Another writer in the same work says
 In these two documents (Matthew and Luke), which profess to give the genealogy " of Christ there no notice whatever of the connection of his only earthily with the stock of David. On the contrary, both the genealogies profess give the descent of Joseph, to connect our Lord with whom by natural generation would be to falsify the whole story of his miraculous birth, and overthrow the Christians
 Again, when the idea that one of the genealogies in Mary is spoken of
 One thing certain that our belief in Mary descent from David grounded " on inference and tradition and not on any direct statement of the sacred writings. And there has been a ceaseless endeavor, both among ancients and moderns,
 Thomas Scott, speaking of the genealogies, says saying with these who seek to defend the history of the Pentateuch against the scrutiny of modern criticism, that the objections urged against and were known long ago. The objections to the genealogy were known long ago. Indeed, and perhaps nothing shows more conclusively than this knowledge The disgraceful, dishonesty and willful deception of the most illustrious of Claistian.

FIG. 7

| | AUTHORS AND BOOKS QUOTED |
|---|---|
| XXU | |
| TACITUS | The Annals of Corneline, the Roman Historian. Translated by Arthur Murphy, Esq. London Jones & Co., 1831. |
| | The History of Corneline. Translated by Arthur Murphy. London: Joans & Co., 1831. |
| | Treaties on the Situation Manners and People of Germany, by Corneline. Translated by Arthur Murphy. London: Jones & Co., 1831. |
| TAYLOR(CHARLES) | Taylor Fragments Being Illustrious of the Manners, Incidents, and of the Holy Scriptures. Indented as an Appendix to Calmet Dictionary of the Bible. London W Stratford, 1801. |
| TAYLOR(ROBERT) | The Being and Discovery of the Origin, Evidences, and Early History of Christianity. By Rev. Robert Tay A. (From the London Edit.) Boston: Mendum, 1875. |
| TAYLOR(THOMAS) | Taylor Mysteries A. Dissertation on the *cd Mysteries by Thomas Taylor. Amsterdam. |
| THORNTON(THOMAS) | A. History of China from the Earliest Records to the Treaty with Great Britain in 1842, by Thomas Thornton, Esq. Member of the R.A.s London William H. Allen & Co., 1844. |
| TAYLOR(H. B.) | Researches Into the Early History of Mankind, and the Development of Civilization by Edward B. Tylor 2d Edit. London: John Murray, 1870. |
| | Primitive Culture Researches into the Development of Mythology. Philosophy. Religion. By Edward. B. Tylor in 2 volts London: John Murray, 1871. |
| VISHOT PUBANA. | The Vishnu Pubana A.System of Hindoo Mythology and Tradition, Translated from the Original by H. H. Wilson M.A.F.R.S. London 1840. |
| VOLNIY (O. F.) | New Researches in Ancient History. Translated from the French of C. F. Vohey Count and Peer of France. (From the London Edit.) Boston: Mendum, 1874. |
| """Edit.)"" | The Meditation on the Revolutions of Em by Count de Vohey, Translated under the immediate inspection of the Author. (From the Paris Edit.) Boston: Mendum, 1873. |
| WAO(O.a) | SeeWestropp. |
| WMTROPR(H. 11.) | Ancient Symbol Worship. Influence of the in the religion of Antiquity. By M. Westropp |

FIG. 8

MATCHING A PAGE LAYOUT FOR EACH PAGE OF A DOCUMENT TO A PAGE TEMPLATE CANDIDATE FROM A LIST OF PAGE LAYOUT CANDIDATES

BACKGROUND

The exemplary embodiment relates to a system and method for the unsupervised generation of page templates applicable to a given document or set of documents.

A document is a collection of one or more pages, where each page can be considered to contain zero or more page elements (such as page headers, footers, images, etc). The arrangement of page elements within a single page define a page layout.

Geometric page layout analysis (GPLA) is often the first step in Document Analysis and Recognition. GPLA algorithms recognize different elements of a page, often in terms of text blocks and image blocks. Examples of such algorithms include the X-Y Cut algorithm, described by Nagy et al. (*A prototype document image analysis system for technical journals. Computer,* 7(25): 10-22, 1992) and the Smearing algorithm, described by Wong et al. (*Document analysis system. IBM Journal of Research and Development,* 26(6):647-656, 1982). These GPLA algorithms receive as input a page image and perform a segmentation based on information (such as pixel information) gathered from the page. These approaches to element recognition are either top-down or bottom-up and mainly aim to delimit boxes of text or images in a page. Some methods such as the X-Y Cut algorithm can generate hierarchical relations among recognized blocks.

The typical output of the GPLA algorithms is a page layout that specifies the geometry of the maximal homogeneous regions contained within the page and the spatial relationships between the homogenous regions. A region is homogeneous if all its area is of one type, such as text, images, etc. However, the page layouts produced by the GPLA algorithms are specific to a page in a document rather than applicable across multiple pages.

Many applications use page templates to segment or categorize a page. In these situations, the page templates are provided as prior knowledge to the application and are not inferred or generated from the document itself. The page templates may be used to categorize pages conforming to the page templates (such as business letters vs. tax forms) or to label the page elements, where the labeling of the page elements is performed by matching the page elements against a known page template. However, all of these applications require a priori knowledge about the structure and composition of the page templates in order to detect and label page elements. For example, many of the applications require user provided page templates. The requirement of this a priori page template knowledge can be problematic since it may be difficult for a user to generates the templates. Also, many of the GPLA algorithms require manual annotation of at least some of the page elements within a given document. Therefore, it would be useful to have a method that allows for the automatic generation of formal page templates according to pages in a document without a priori knowledge of any page template composition.

Additionally, it would be advantageous to have a method of describing the composition of a page template based on the geometric relationships between the labeled elements of the document pages.

BRIEF DESCRIPTION

In one aspect of the exemplary embodiment, a computer-implemented method for generation of page templates is provided. The method includes providing a document in computer memory. Using a computer processor, page elements within the document are identified and labeled. For a plurality of pages of the document, a set of geometric relations between pairs of page elements co-occurring on each page is computed, and the set of geometric relations is associated with the page. The method also includes generating a set of page template candidates based at least in part on the computed geometric relations, selecting page templates from the set of page template candidates, and outputting the selected page templates.

In another aspect, a computer-based system for generating page templates is provided. The system includes a computer processor and computer memory which stores an element labeling module, a geometrical relation computation module, a page template candidate generator, and a page template matching module. The element labeling module is configured to identify and label page elements within a document. The geometrical relation computation module is configured to, for a plurality of pages in the document, compute at least one geometric relation between pairs of page elements co-occurring on each page, and associate the at least one geometric relation with the page. The template candidate generator is configured to generate a set of page template candidates based at least in part on the computed at least one geometric relation. The page template matching module is configured to select page templates from the set of page template candidates, and output the selected page templates.

In yet another aspect, a storage medium containing, in a computer readable form, a formal description of a page template is provided. The formal description includes at least one description of a geometrical relation between a pair of page elements. The geometrical relation includes a label describing the type of each page element, and an alignment between the pair of page elements.

BRIEF DESCRIPTION OF THE DRAWINGS

FIG. 6 graphically illustrates a page from an input document with a header that was not detected by the header page element detection component(s) illustrated in FIG. 2;

FIG. 7 graphically illustrates another page from an input document with a header and line of text that were not detected by the corresponding page element detection components illustrated in FIG. 2; and FIG. 8 graphically illustrates another page from an input document with an OCR error that caused the page element detection components to not recognize the page number within the page.

DETAILED DESCRIPTION

Aspects of the present exemplary embodiment relate to a system and method for the unsupervised generation of page templates applicable to a given document or set of documents.

The method generates, by inference, page templates that could have been used to lay out page elements (such as page headers, footers, images, etc) on pages within the document. Briefly, the method detects page layouts by using available element detection components to automatically detect individual page elements. The method then infers a set of candidate page templates based on the geometric relationships between the detected individual page elements. Elements that are geometrically related frequently (i.e., across multiple pages) are added to the page template. The page templates are then output in a formal description language such that the geometric relationship information between the page elements is retained. The output page templates can then be used for quality assurance (QA), document/page correction, or any other purpose. The present exemplary method and system are useful, for example, in the context of scanning many books for a library.

Within the scope of the exemplary method and system, a page layout is an arrangement of a set of elements having typography-based geometric relations. A page template is the formal description of a page layout, and is generally common to a set of page layouts. Page templates can be considered as the geometrical expression of a generic page layout. Page templates for a given document are capable of being inferred due to the repetition of pages within the document sharing a common page layout. For this reason, the exemplary method is optimized when a document has at least a minimal number of pages sharing the same page template. Moreover, a document may have several page templates. In general, at least one of the page templates (and typically two or more) matches a plurality of pages of the document(s) from which it is inferred.

Formally, a page template can be described as a graph, where nodes of the graph correspond to typed elements (i.e., elements categorized according to type), and edges correspond to geometric relations. Mathematically, the page template graph is defined as follows:

(1) pageTemplate=$\{\{n_i\}_{i=1...N}, \{R(n_i,n_j)_{i,j=1,2...M}\}\}$
(2) $n_i$=(type of element)
(3) type: provided by the element detection components
(4) R(a,b)={L(a,b), value}
(5) L∈ a predetermined set of relations, such as {XJustified, XCentered, Flush-Left, Flush-Right, YJustified, YCentered, Flush-Top, Flush-Bottom} where n is a typed element, a and b are instances of typed elements n, N is the number of typed elements, R is a geometric relation, M is the number of geometric relations (R) between nodes, and L is a labeled relation between typed elements a and b.

A geometric relation R(a,b) has a value which characterizes more precisely the labeled relation L between typed elements a and b. A labeled relation L describes the geometrical relationship between elements a and b with respect to vertical and horizontal alignment. For example, in one embodiment, the labeled relation L indicates whether typed elements a and b are aligned horizontally (along the horizontal "X" axis, corresponding to L relationships: XJustified, XCentered, Flush-Left and Flush-Right) or vertically (along the vertical "Y" axis, corresponding to L relationships: YJustified, YCentered, Flush-Top and Flush-Bottom). A horizontal alignment is XJustified when both elements (blocks) a and b extend to the left and right margins of a page. An alignment is XCentered when the center points of both elements a and b are centered between the left and right margins of a page. A horizontal alignment is Flush-Left when both elements a and b extend to the left margin of the page but are not justified. A horizontal alignment is Flush-Right when both elements a and b extend to the right margin of the page but are not justified. A vertical alignment is YJustified when both blocks a and b extend to the top and bottom margins of the page. A vertical alignment is YCentered when the center points of both elements a and b are centered with respect to the top and bottom margins. A vertical alignment is Flush-Top when both elements a and b extend to the top margin of the page. A vertical alignment is Flush-Bottom when both elements a and b extend to the bottom margin of the page. FIG. 1 graphically illustrates possible alignments between elements a and b, which are enumerated in Table 1 below.

TABLE 1

List of geometric relations between two typed elements a and b.
Labeled Relations L

| | | | | |
|---|---|---|---|---|
| horizontal | (a) XJustified | (b) Flush-Left | (c) Flush-Right | (d) XCentered |
| vertical | (e) YJustified | (f) Flush-Top | (g) Flush-Bottom | (h) YCentered |

The value associated with the labeled relation L in geometric relation R is used to compare a candidate page template against a page layout. In one aspect of the exemplary method and system, the value indicates a measure of distance between elements a and b. Various distance measurement functions may be used to calculate the distance between elements a and b. For example, the functions may include, but are not limited to, the distance between the centers of a and b, between a common point relative to each element a and b, or between the closest edges of a and b. Additionally, the value may be an absolute distance between elements a and b, or a vector distance in the horizontal (x-axis) or vertical (y-axis) plane, depending on the geometric relation. For example, if typed elements a and b are aligned flush-left as in (b) of FIG. 1, then the measured distance may be between the center points of a and b (which will include both an x-axis and y-axis vector) or only using the y-axis vector, such that only the shortest vertical distance is measured. In one aspect of the exemplary embodiment, the vertical distance between vertically spaced elements a and b is used for labeled relations (a), (b), (c), (d) and the shortest horizontal distance between horizontally spaced elements a and b is used for the labeled relations (e), (f), (g) and (h).

Figure 1A:
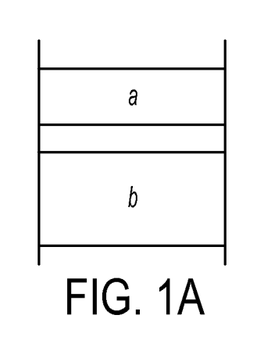
FIG. 1 graphically illustrates various alignments between pairs of page elements within a page of an input document.
Figure 1B:
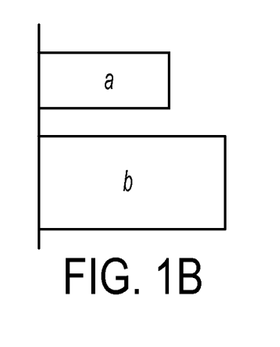
Figure 1C:
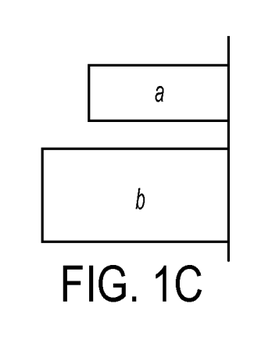
Figure 1D:
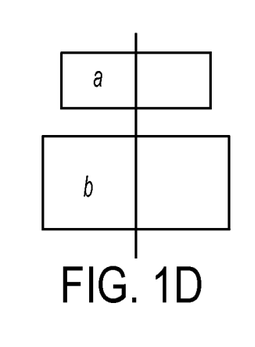
Figure 1E:
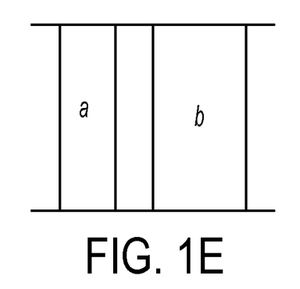
Figure 1F:
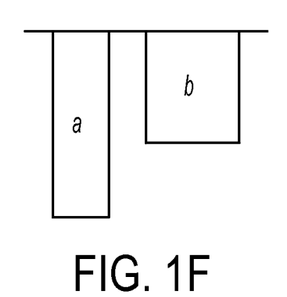
Figure 1G:
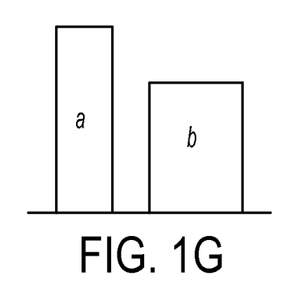
Figure 1H:
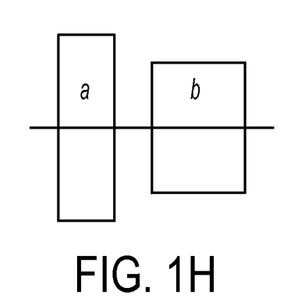
Figure 2:
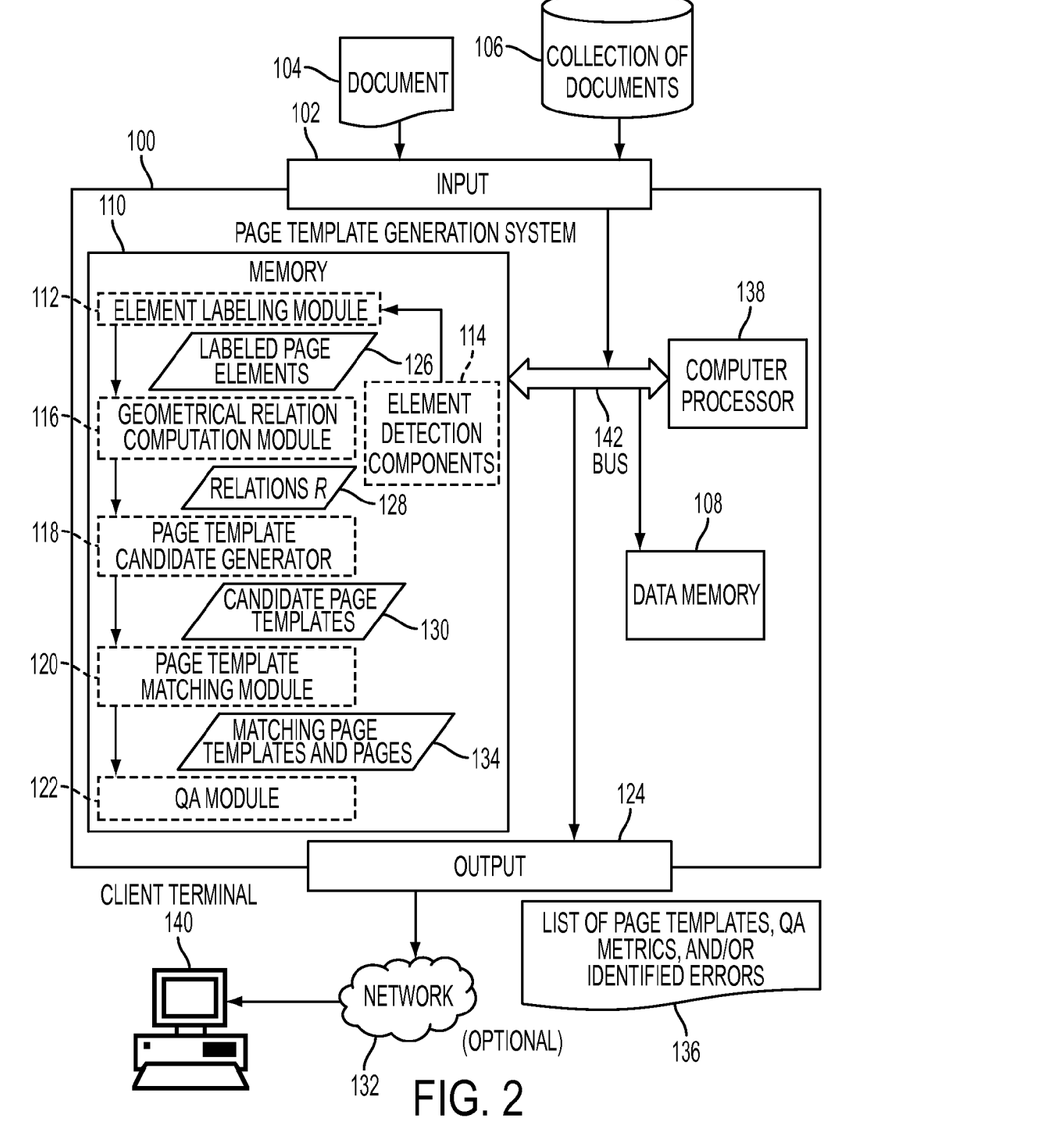
FIG. 2 is a functional block diagram of an exemplary system for generating page templates.

With reference to FIG. 2, an exemplary system 100 for generating page templates from a document or collection of documents is shown. The system 100 includes an input device 102, for receiving a document 104 or a collection of documents 106. In order to simplify the explanation of the exemplary system and method presented herein, it is assumed that a multi-page document 104 is input into the system 100, although the same system and method can be used to process a collection of documents 106. Prior to inputting, the document 104 may be stored in any suitable tangible media such as a ROM or RAM drive or may be input into the system 100 in the form of a carrier wave, e.g., via the Internet. Alternatively, the document 104 may be generated within the system 100, itself. The input device 102 may include a modem link, a wired or wireless connection, USB port, floppy or hard disk receiver, or the like and may be separated or combined with other components of the system 100.

The system 100 includes data memory 108 for storing the document 104 during processing. Main memory 110 of the system 100 stores an element labeling module 112, a set of element detection components 114, a geometrical relation computation module 116, a page template candidate generator 118, a page template matching module 120, and a quality assurance (QA) module 122. Outputs from modules 112, 114, 116, 118, 120 and 122 may be stored in memories 108, 110 or output via an output device 124 to a client terminal 140, optionally through a network 132 such as the internet.

The element labeling module 112 receives as input the document 104 via the input device 102 and, in conjunction with the set of available element detection components 114, identifies and labels (types), when possible, each element on every page of the document 104. The element labeling module 112 then passes the labeled page elements 126 to the geometrical relation computation module 116. The geometrical relation computation module 116 computes a geometric relation R for one or more pairs of elements co-occurring on the same page that were identified and labeled by the element labeling module 112. The geometrical relation computation module 116 then passes the set of geometric relations R 128 to the page template candidate generator 118.

The page template candidate generator 118 uses the geometric relations R to generate candidate page templates 130 based on the page layouts described by the geometric relations 128. Each page of the document 104 having two or more labeled elements will have a page layout. A page layout is composed of the set of computed geometric relations R co-occurring on the page. The number of geometric relations R computed may be a function of the number of elements identified on the page. However, it is not required that every possible relationship be computed. In general, each identified element is in at least one computed geometric relation R.

The page template candidate generator 118 then passes the candidate page templates 130 to the page template matching module 120 which compares the candidate page templates 130 to the page layout of each page in the document 104. The page template matching module 120 produces a list 134 which contains page templates that match or partially match page layouts within the input document 104. By "match", it is meant that the values of the geometric relations R vary by no more than a predetermined amount. By "partially match," it is meant that the page layout is missing one of the geometric relations R. The list 134 may also contain a list of the document pages associated with each of the page templates. Optionally, the list 134 is then sent to the QA module 122 which identifies and optionally corrects errors that are identified in partially matching page layouts. The QA module 122 may also generate quality indicator metrics based on any identified errors. The QA module 122 then outputs the quality metrics, corrected page layouts and/or the corrected pages 136 to memories 108, 110 or via output device 124.

The element labeling module 112, set of element detection components 114, geometrical relation computation module 116, page template candidate generator 118, page template matching module 120 and QA module 122 may be implemented as hardware or a combination of hardware and software. The element detection components 114 are components that are capable of identifying and labeling discrete elements within a page layout. In one embodiment, the element detection components 114 are capable of identifying and labeling at least four different types of page elements. Examples of elements that may be detected by the element detection components 114 include, but are not limited to, page headers and footers, text areas (e.g., a page body), enumerated patterns, copyright notices, email addresses, page numbers, table of contents entries and corresponding titles in the document body, captions, footnotes, drop caps (usually enlarged first letters that span two or more lines of text), and images (e.g. photographs, graphics, charts, etc). Any commercially or publicly available element detection components may be used to detect and label page layout elements. Examples of suitable page element detection components are described in U.S. Pub. No. 2006/0156226, published Jul. 13, 2006, entitled METHOD AND APPARATUS FOR DETECTING PAGINATION CONSTRUCTS INCLUDING A HEADER AND A FOOTER IN LEGACY DOCUMENTS, by Dejean et al.; U.S. Pub. No. 2009/0046918, published Feb. 19, 2009, entitled SYSTEMS AND METHODS FOR NOTES DETECTION, by Dejean; U.S. Pub. No. 2006/0248070, published Nov. 2, 2006, entitled STRUCTURING DOCUMENT BASED ON TABLE OF CONTENTS, by Dejean et al.; U.S. Pub. No. 2008/0077847, published Mar. 27, 2008, entitled CAPTIONS DETECTOR, by Dejean; and U.S. Pub. No. 2008/0114757, published May 15, 2008, entitled VERSATILE PAGE NUMBER DETECTOR, by Dejean et al.; the disclosures of all of which are incorporated herein by reference in their entireties. For example, the page number element detection component looks for a sequence of numbers or other characters which increment by one over a set of several pages. Other detectors look for other features (singly or in combination) that are unique to the element to be identified. In the exemplary embodiment, the components 112, 114, 116, 118, 120, 122 comprise software instructions stored in main memory 110, which are executed by a computer processor 138. The processor 138, such as the computer's CPU, may control the overall operation of the computer system 100 by execution of processing instructions stored in memory 110. Components 102, 108, 110, 112, 114, 116, 118, 120, 122, 124, 138 may be connected by a data control bus 142. As will be appreciated, system 100 may include fewer or more components while still having the same functionality. For example, components 112, 114, 116, 118, 120, 122 may be combined to form fewer components, or may be functionally separated to form more individual components.

As will be appreciated, the page template generation system 100 may comprise one or more computing devices, such as a personal computer, PDA, laptop computer, server computer, or combination thereof. Memories 108, 110 may be integral or separate and may represent any type of computer readable medium such as random access memory (RAM), read only memory (ROM), magnetic disk or tape, optical disk, flash memory, or holographic memory. In one embodiment, the memories 108, 110 comprise a combination of random access memory and read only memory. In some embodiments, the processor 138 and memory 108 and/or 110 may be combined in a single chip.

Figure 3:
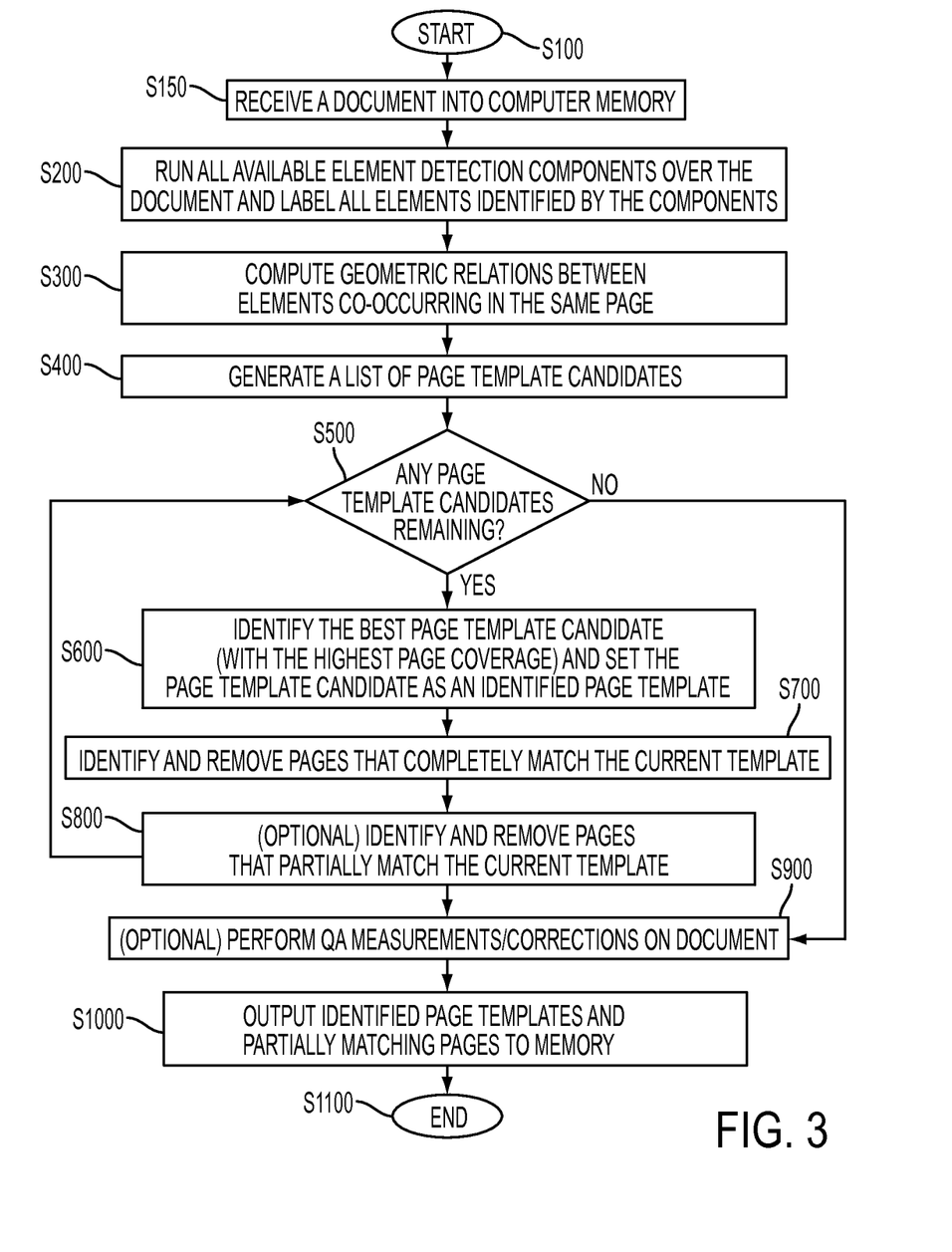
FIG. 3 is a flow diagram illustrating a method for generating page templates from an input document that may be performed by the system illustrated in FIG. 2.

With reference to FIG. 3, an exemplary method for unsupervised generation of page templates within a document is illustrated. The method may employ the system 100 illustrated in FIG. 2. It is to be appreciated that the exemplary method may include fewer, more, or different steps from those shown and need not proceed in the order illustrated. The method illustrated in FIG. 3 may be implemented in a computer program product that may be executed on a computer. The computer program product may be a tangible computer-readable recording medium (such as a disk or other memory storage device) on which a control program is recorded, or may be a transmittable carrier wave in which the control program is embodied as a data signal. The illustrated methods may be entirely automated or may include some user input, as noted herein.

The method begins at step S100. At step S150, the page template generation system 100 receives a document 104 or a collection of documents 106 into computer memory 108 via input device 102.

Figure 4:
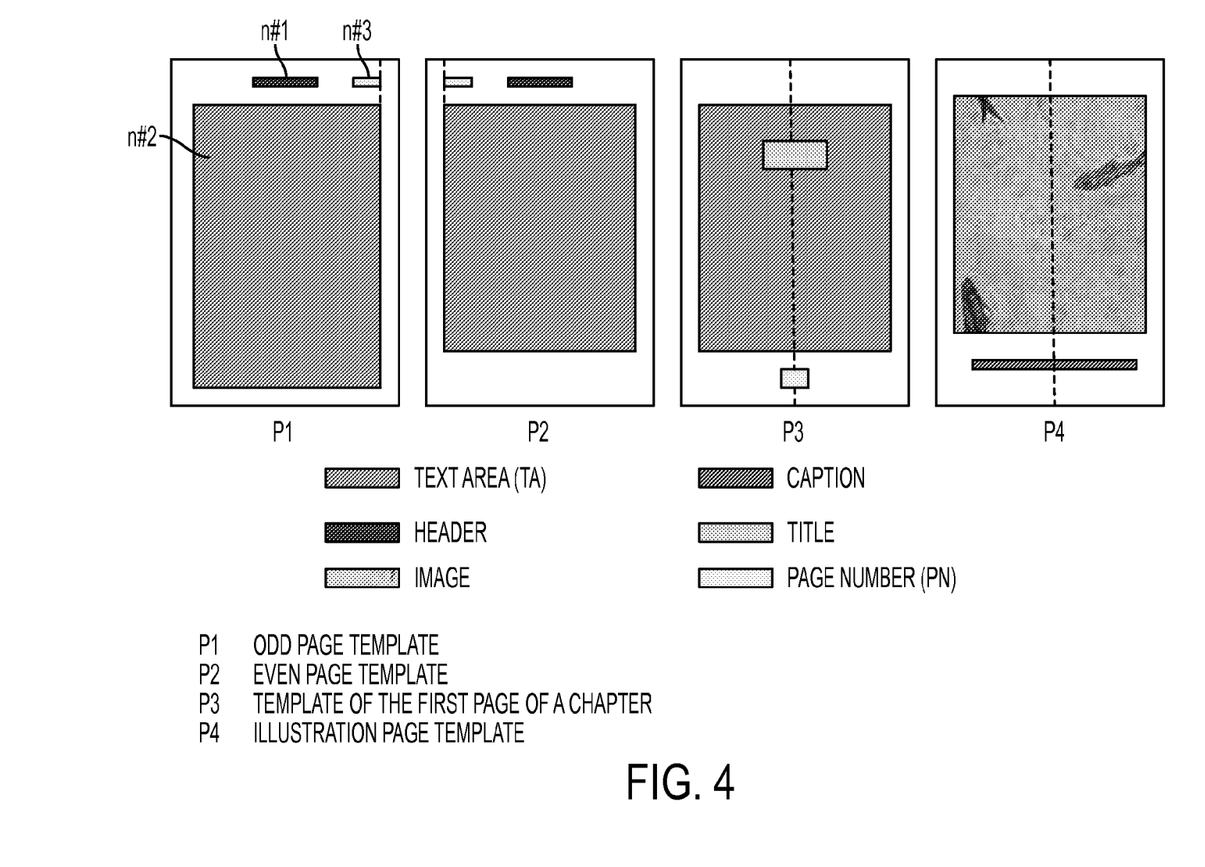
FIG. 4 graphically illustrates four example pages from an input document and their detected page elements.

At step S200, the element labeling module 112 runs all element detection components 114 over the input document 104. The element detection components 114 label all identified page elements with respect to the location, size, and type of the element. For example, a page element may be labeled as a page number, located at position 100, 200 on the page (100 pixels in direction x and 200 in direction y from a reference point), and having a width and height of 5 and 8 (pixels), respectively. As described in the exemplary embodiment, the page elements are considered to be rectangular in shape. However, in other embodiments, labeled elements may have a non-rectangular shape. Additionally, a single labeled element may encompass a single identified element on a page, or it may encompass a bounding box containing all elements identified as the same type on a single page. In the latter case, the bounding box represents the size and position of the labeled element. The decision on whether a labeled element should encompass a single identified element or a bounding box containing multiple same type elements may depend on factors such as the type of document (e.g., whether it was OCR'd or not) or the quality/reliability of the element detection component. A single page can have multiple types of elements, and the elements may overlap each other. For example, FIG. 4 illustrates four pages P1, P2, P3, P4 containing a plurality of labeled elements. Each page P1, P2, P3, P4 contains multiple elements, and page P3 contains elements that overlap each other (a title element 200 overlapping a text area 202). The element labeling module 112 generates a list of labeled page elements 126 based on the output of the element detection components 114. The list 126 is then passed to the geometrical relation computation module 116.

At step S300, the geometrical relation computation module 116 computes geometric relations R between elements co-occurring in the same page. That is, for each page of the document 104, some or all possible geometric relations R between pairs of labeled elements are considered, and the geometric relations R having a geometric relationship shown in Table 1 are computed. After the geometric relations R for each page are computed, each page will have a page layout defined by a set of one or more geometric relations R within the page. For example, with reference to FIG. 4, the set of geometric relations R for page P1 represents the page layout which may be represented by the following page template description:

model#1={{n#1,n#2,n#3}, {R1,R2,R3}}
n#1={header}
n#2={text area}
n#3={page number}
R1(n#2,n#1)={L(n#2,n#1), distance}={XCentered, 16}
R2(n#2,n#3)={L(n#2,n#3), distance}={Flush-Right, 16}
R3(n#1,n#3)={L(n#1,n#3), distance}={Flush-Top, 16} where "model#1" is a unique identifier for the page template; "n#1", "n#2" and "n#3" are unique identifiers for labeled elements; R1, R2 and R3 are geometric relations, and L1, L2 and L3 represent a labeled relation. In other words, the page template model#1 comprises labeled page elements n#1 (a header), n#2 (a text area), and n#3 (a page number) which are geometrically arranged in the manner specified by geometric relations R1, R2 and R3. Specifically, geometric relation R1 describes the geometric relationship between text area n#2 and header n#1 as both being centered horizontally (i.e., with respect to the X-plane) with a distance of 16 (pixels) between them. This geometric relationship equates to relationship (d) given in Table 1. Geometric relation R2 describes the geometric relationship between text area n#2 and page number n#3 as both being flush-right with a distance of 16 (pixels) between them, and geometric relation R3 describes the geometric relationship between header n#1 and page number n#3 as being flush-top with a distance of 98 (pixels) between them. Because a page template is composed of at least on one geometric relation R, in order to be able to generate a page template from a page, the exemplary embodiment requires at least two page elements. In an alternate embodiment, if a document page contains only one element (such as, for example, a chapter title), the page itself can be considered as an element. In this embodiment, the geometric relation R can be computed based on the geometrical position of the chapter title with respect to the document page properties (such as height and width) to get a geometric relation that may or may not exist in Table 1. Once the geometrical relation computation module 116 computes the set of geometric relations R with respect to each page, they are passed to the page template candidate generator 118.

Figure 5A:
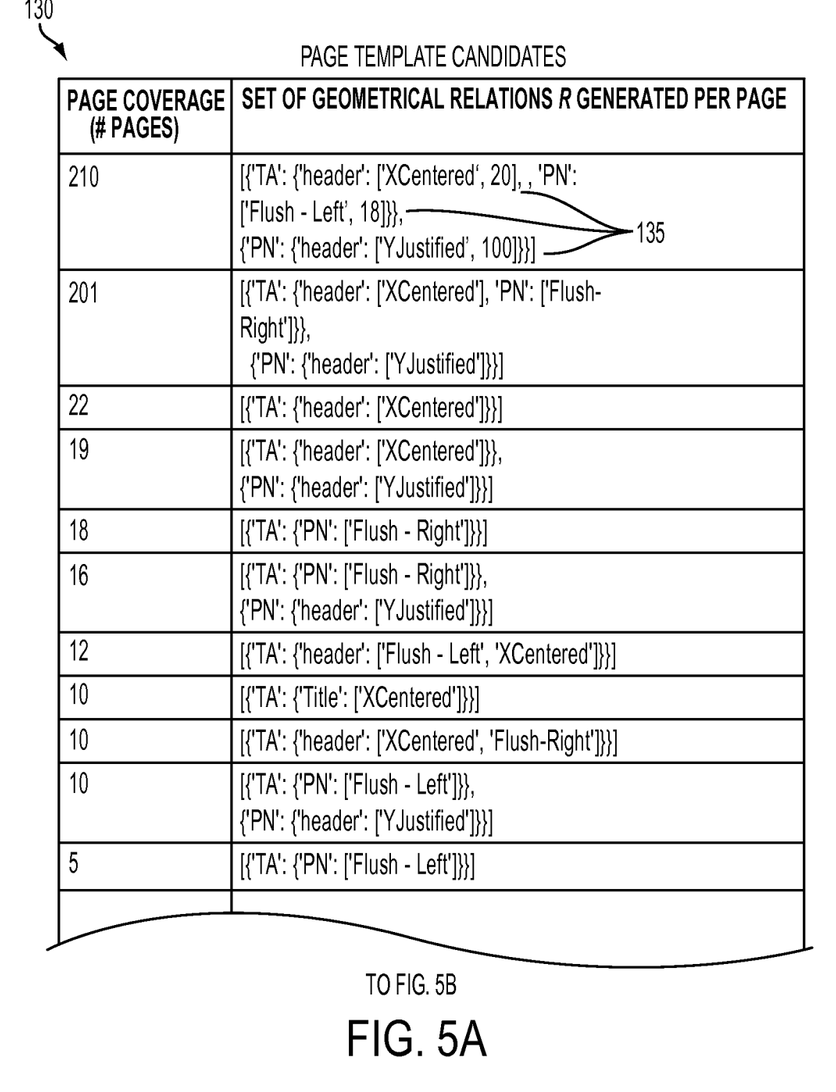
FIG. 5 is a table illustrating the structure of page template candidates and the relationships between pairs of page elements.
Figure 5B:
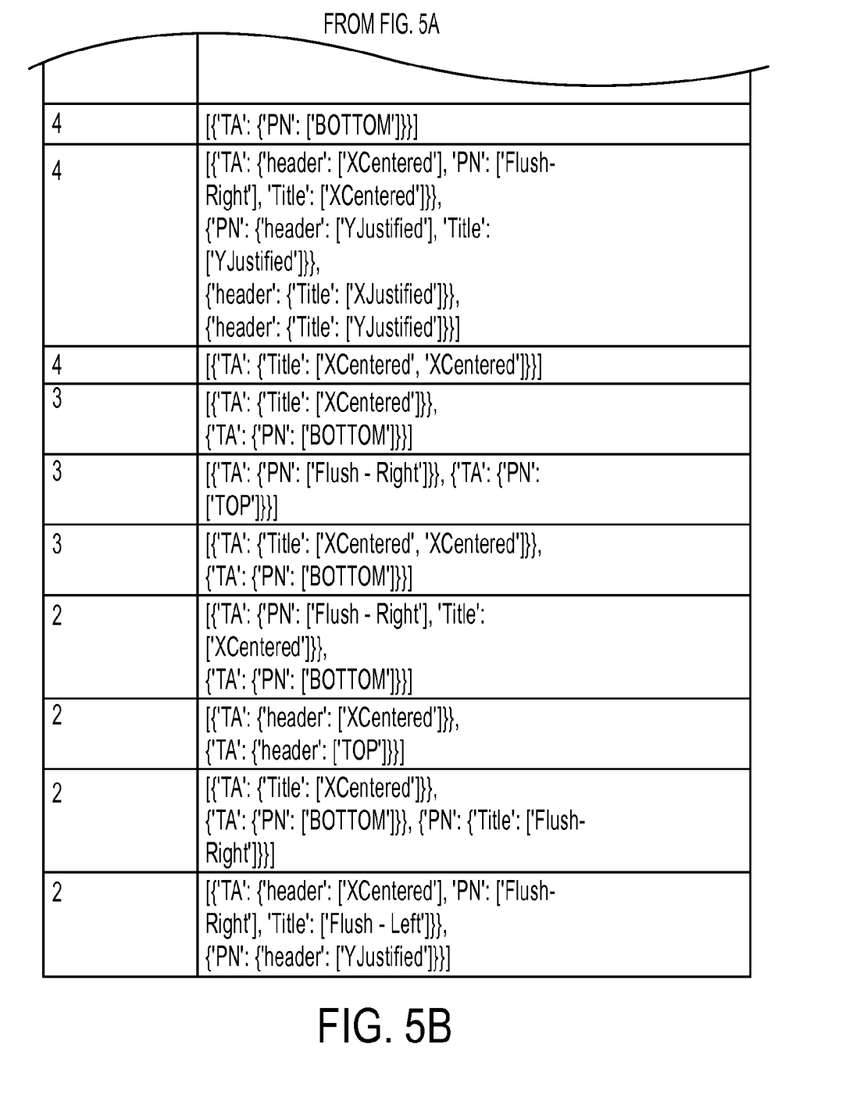

At step S400, the page template candidate generator 118 generates a list of page template candidates 130. In the exemplary method and system, this is performed by associating a set of geometric relations R with each page in the document 104. The number of pages sharing each unique set of geometric relations R are then counted. For example, FIG. 5 illustrates a collection of geometric relations R generated from a book in a sample document collection. Each row of FIG. 5 contains a count (first column) of the number of pages within the document 104 that contain the corresponding set of geometric relations R (second column). The geometric relations R in the second column of FIG. 5 are expressed in a compact format. For example, the first row of FIG. 5 contains a set of geometric relations R found in 210 pages of the processed document 104. The set of geometric relations R in the first row of FIG. 5 corresponds to a text area (TA) and header that are centered horizontally, the same text area and page number (PN) that are left justified and a page number and header that are justified vertically. The page template candidate generator 118 then computes a value for each individual geometric relation R in each candidate page template by applying a function over the series of values provided by each page where the geometric relation occurs. The function may be any mathematical or logical function that is capable of normalizing a set of values to a discrete value or value set. The computed values will be used in later calculations. In the exemplary embodiment provided here, the function is the mean of the provided values. For example, the geometric relations R1, R2 and R3 above each have a value (distance) attributed to them. If these geometric relations R1, R2 and R3 occur across multiple pages, then the page template candidate generator 118 will apply the function (here, the mean) across each value for each page. For instance, if geometric relation R1 has a value of 16 on one page, 18 on another page, and 20 on another page, then the value assigned to the geometric relation R in the page template candidate is 18 (i.e., the mean of 16, 18 and 20). Example geometric relation values 135 are shown in the first row of FIG. 5. In one alternate embodiment, if the standard deviation of the series is higher than a given threshold, the relation is not considered as a geometrical one (no consistent distance), and is discarded from the candidate template. Also, geometric relations R are only considered for those pages having a value that falls within a predetermined variation of the statistical mean.

The page template candidate generator 118 then selects the sets of geometric relations R having a number of matching document pages (page coverage) over a given threshold. In the exemplary method and system, a set of geometric relations R completely matches a document page if every geometric relation R within the document page exists in the set of geometric relations R, and vice versa. This matching is performed independent of the values associated with each geometric relation R in the set of geometric relations. In alternate embodiments, the matching considers the values when determining whether a set of geometric relations R matches a document page. In the exemplary embodiment, the page coverage threshold is about five pages. In alternate embodiments, the page coverage threshold may be relative to the pages that have not yet been associated with a page template (such as 25% of the remaining pages). Alternate embodiments may have a page coverage threshold that differs due to environmental constraints such as document size, element detection accuracy, and other variables. Thus, in FIG. 5, the bottom ten candidate page templates are discarded since their page coverage is less than five. The selected page template candidates 130 (all the rest) are then passed to the page template matching module 120.

At step S500, the page template matching module 120 determines whether there are any unprocessed page template candidates remaining in the set of selected page template candidates 130. If there are, then the method proceeds to step S600, else to step S900.

At step S600, the page template matching module 120 selects the page template candidate from the set of candidate page templates 130 having the highest page coverage. The selected page template candidate is removed from the set of candidate page templates 130 and is identified as a page template.

At step S700, the page template matching module 120 assigns the pages within the document 104 that were previously identified in step S400 as matching the selected page template. The assigned pages are then removed from further consideration.

At optional step S800, the page template matching module 120 identifies pages that partially match the selected page template. Only pages that have not already been assigned to a page template are considered. Partially matching pages are identified by finding pages in the document 104 having similar geometrical layouts. A partially matching page is more likely to have an element that was not labeled by the element labeling module 112 in step S200. Since a page template can be viewed as a graph (with each typed element representing a node, and the geometric relation R between elements representing an edge), finding a partial match between a page template and a page can be considered as graph matching, whose optimal solution in general is an NP (nondeterministic polynomial) problem. Any graph matching algorithm may be used to find a partial (or complete) match between geometric page layouts and the selected page template. Fuzzy matching algorithms that compare geometric layout and text properties of page layouts may also be used. An example of such an algorithm is described in U.S. Pub. No. 2004/0013302, published Jan. 22, 2004, entitled DOCUMENT CLASSIFICATION AND LABELING USING LAYOUT GRAPH MATCHING, by Ma et al. ("Ma"), the disclosure of which is incorporated herein by reference in its entirety. The Ma algorithm utilizes a simplified version of a branch and bound search algorithm. Its solution allows for full or partial matching, where partial matching corresponds to a page where a set of elements of the template were properly recognized, but some are missing (not correctly recognized for instance). Once a partial match is found, the page template matching module 120 associates the identified page as a partial match of the selected page template. The partial match from the fuzzy matching algorithm allows for the determination of potential missing typed element locations within the identified page. In one alternate embodiment, the geometric relation values calculated in S400 (FIG. 7, 135) are used in the identification of partially matching page templates. In this embodiment, the geometric relation values in the selected page template are compared against the values in the document page. If the difference between the values are within a given threshold, then the corresponding geometric relations can be said to match. After a partially matching page is identified, it is removed from further consideration.

Fuzzy matching is used to cope with noise (errors) present in the element detection process. Noise can be categorized into either missing typed elements, or missing text. Missing typed elements occur where some typed elements of the page layout were not recognized by the element labeling module 112 in step S200. For example, in FIG. 6, a page 250 with a header 252 missed by a header detection component is illustrated. With partial matching, the page is detected as partially matching a page template that includes all of the labeled elements of FIG. 6 in addition to a header. The partially matching page 250 is then reexamined at a later step to determine whether an element of the page was not detected (e.g., there is some content at the expected header location). Another example is given with respect to FIG. 7. Page 270 contains elements 272 and 274 which were missed by the element detection components 114. Notably, the line of text 274 should have been included in the text area element 276, but the element detection component 114 omitted the line of text 274 from the text area 276. Missing or misidentified text occurs where there are OCR (optical character recognition) errors while scanning a document page. FIG. 8 illustrates such an instance. The page 260 of FIG. 8 has a page element 262 that was not labeled as a page number due to an OCR error. The page element should have scanned "XXV", but instead scanned "XXU". Because of this OCR error, the page number detection component is unable to properly label element 262 as a page number. The fuzzy matching step may allow the improperly labeled text to be labeled as a page number if it is in a relationship with another element that would otherwise allow the page to be an exact match. The page template matching module 120 then outputs the identified page templates and matching page information 134 to the QA module 122.

At optional step S900, the QA module 122 receives the matching page templates and document pages 134 and performs QA measurements and corrections on the input document 104. The QA statistics that may be measured include, but are not limited to, the ratio of the number of detected missed page elements to the number of labeled elements, and the proportion of document pages associated or not associated with a page template. The ratio may be used to trigger a warning or error notification to an end user. For document pages that partially match a page template, the QA module 122 may optionally reexamine the document pages that partially match a page template to determine whether there was an error in the element detection process. If it is determined that there may have been an error, the QA module 122 then performs correction actions on the identified document pages. For instance, the QA module 122 may label an originally missed element, which is now predicted to exist, allowing the geometric relations R to be computed, or the QA module 122 may direct the element labeling module 112 to rescan (and if necessary, correct) the document page with the element detection components 114 while paying particular attention to the geometric area of the page that does not match the given page template. Alternatively, the QA module 122 can output the partially matching pages and/or the page template to an client terminal's 140 graphical user interface (GUI) operative to allow an end user to determine whether an error was made in labeling the page element.

At step S1000, the QA module 122 (or any other module of the system 100) outputs the identified page templates, completely matching document pages, as well as partially matching document pages which have been recognized as matching, QA statistics, and page errors and/or corrections to one or more of system memories 108, 110, or a client terminal 140 or any other output or storage device.

The method ends at step S1100.

EXAMPLES

To evaluate the system and method, the following evaluations were performed:

Evaluation 1

The following page templates were generated from a large sample document (a book) with a minimal page coverage threshold value of five pages.

Template 1 (Initially Covered Pages: 210, Added by Fuzzy Match: 55)
header#0
TA#1
PN#2
XCentered[[(TA#1, header#0)]]=17
Left[[(TA#1, PN#2)]]=16
YCentered[[(PN#2, header#0)]]=98
Template 2 (Initially Covered Pages: 201, Added by Fuzzy Match: 55)
header#6
TA#7
PN#8
XCentered[[(TA#7, header#6)]]=17
Right[[(TA#7, PN#8)]]=17
YCentered[[(PN#8, header#6)]]=66
Template 3 (Initially Covered Pages: 11, Added by Fuzzy Match: None)
header#12
TA#13
XCentered[[(TA#13, header#12)]]=18
Template 4 (Initially Covered Pages: 10, Added by Fuzzy Match: 35)
Title#34
TA#35
XCentered[[(TA#35, Title#34)]]=−390

In the example document, there were 62 pages not covered by a page template. Most of these pages were part of the front or back-matter of the book, where no geometric relation between typed elements were found.

Evaluation 2

An indirect quantitative evaluation was performed which used a dataset from the INEX BookStructure task (http://users.info.unicaen.fr/~doucet/StructureExtraction2009/). The ground truth of the data corresponds to the hierarchical structure of 427 books. In order to evaluate the exemplary method, only page templates containing a page element of the type "Title" are considered. Pages matching this template should correspond to an entry in the ground truth. Such a template usually corresponds to the first page of a chapter. The method generates results for 58 books among 427 (not all books have such a layout).

TABLE 2

| "Title" templates without fuzzy matching | | "Title" templates with correction | |
|---|---|---|---|
| Precision | Recall | Precision | Recall |
| 93.8 | 51.7 | 91.9 | 60.1 |

Here, precision represents the percentage of tagged pages that have been correctly tagged with the template. Recall is the percentages of pages which should have been tagged with the template (based on the ground truth) which were in fact correctly tagged. Table 2 shows that the generation of page templates with "Title" element is successful for this collection since a page templates are generated with a precision higher than 90%. In other words, when a template is generated, it is generally correct. The fuzzy match increases the recall by 9 points, while precision decreases by 2 points. Errors are not always due to the exemplary method as some entries (often first pages of prefaces or indexes) detected by the method are not in the ground-truth (there is a bias toward entries mentioned in the table of contents, and entries such as prefaces, table of contents themselves are not always listed in the table of contents.)

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A computer-implemented method for generation of page templates used to layout page elements in a document without priori knowledge of a page template composition used for the document, the method comprising:
   receiving a document at an element labeling module;
   using a computer processor, identifying and labeling each page element on every page of the document;
   computing a set of geometric relations between the page elements co-occurring on the each page;
   defining a page layout for the each page including the set of the geometric relations within the each page;
   generating page template candidates based on the page layouts described by the geometric relations;
   generating a list of page template candidates, the generating the list including:
      comparing the candidate page templates to the page layout of each page in the document;
      generating a list of page templates that match page layouts within the document having a value of the geometric relations that vary no more than a predetermined amount;
   identifying a page template from the list of page template candidates having a highest match;
   removing pages in the document matching the identified page template;
   correcting pages in the document not matching the identified page template;
   repeating the identifying, removing, and correcting until the list is empty; and,
   outputting each identified page template to a memory.

2. The method of claim 1, wherein one of the plurality of pages includes only a single labeled page element, and the page itself is identified and labeled as a page element.

3. The method of claim 1, further comprising:
   identifying document pages that match one of the selected page templates;
   associating each matching document page with the corresponding selected page template; and
   outputting data identifying at least one matching document page and the associated selected page template.

4. The method of claim 1, further comprising:
identifying document pages that only partially match one of the selected page templates;
associating each partially matching document page with the corresponding selected page template; and
outputting data identifying at least one partially matching document page and the associated selected page template.

5. The method of claim 4, further comprising:
computing quality assurance metrics based at least in part on the identified partially matching document pages and the associated selected page template; and
outputting the quality assurance metrics.

6. The method of claim 5, wherein the quality assurance metrics include a ratio between non-detected page elements and the number of page elements detected within the document.

7. The method of claim 4, wherein computing geometric relations between pairs of page elements includes determining the alignment between pairs of page elements;
wherein the computation of geometric relations between pairs of page elements also includes determining a distance between the page elements; and
wherein the identification of pages within the document having a set of geometric relations that partially match the set of geometric relations corresponding to the selected page template is based at least partially on the distance between the page elements.

8. The method of claim 4, further comprising applying at least one correction to at least one page in the document based at least in part on the partially matching set of geometric relations.

9. The method of claim 4, further comprising:
identifying at least one element detection error in the document based at least in part on the partially matching document page and the corresponding selected page template; and
outputting the element detection error to at least one of:
computer memory, or
a client terminal.

10. The method of claim 1, wherein identifying and labeling page elements within the document comprises using element detection components that are capable of detecting element types selected from:
page headers,
page footers,
text areas,
enumerated patterns,
copyright notices,
email addresses,
page numbers,
table of contents entries and corresponding titles in the document body,
captions footnotes,
drop caps, and
images.

11. The method of claim 10, wherein detection components for at least four of the element types are provided.

12. The method of claim 1, wherein computing a set of geometric relations between pairs of page elements includes labeling the alignment between a pair of page elements, wherein the alignment is selected from a set of predefined alignments.

13. The method of claim 12, wherein the determined alignment between pairs of page elements is one of the following:
XJustified,
XCentered,
Flush-Left,
Flush-Right,
YJustified,
YCentered,
Flush-Top, and
Flush-Bottom.

14. The method of claim 12, further comprising determining a distance between the pair of page elements labeled with the alignment.

15. The method of claim 12, wherein at least one pair of page elements overlap.

16. The method of claim 1, wherein selecting page templates from the set of page template candidates comprises:
identifying a page template candidate from the set of page template candidates having the highest page coverage value;
setting the identified page template candidate as the selected page template; and
identifying document pages having a set of geometric relations that match the set of geometric relations corresponding to the selected page template; and
associating the identified document pages with the selected page template.

17. The method of claim 1, wherein generating a set of page template candidates comprises:
for each set of computed geometric relations associated with a page of the document:
calculating the number of pages in the document sharing the same set of geometric relations;
setting the number as the page coverage value for the set of geometric relations; and
selecting sets of computed geometric relations having a page coverage value above a threshold.

18. A computer-based system for generating page templates used to layout page elements in a document without priori knowledge of a page template composition used for the document, the system comprising:
a computer processor;
computer memory which stores:
an element labeling module for identifying and labeling each page element on every page of the document,
a geometrical relation computation module for computing a set of geometric relations between the page elements co-occurring on the each page,
a page template candidate generator for defining a page layout for the each page including the set of the geometric relations within the each page, generating page template candidates based on the page layouts described by the geometric relations, and generating a list of page template candidates, the generating the list including; and
a page template matching module adapted to (a) from the list, identify a page template candidate having a highest page coverage value; (b) set the identified page template candidate as the selected page template and remove the identified page template candidate from the list of page template candidates; (c) identify pages in the document having a set of geometric relations that match the set of geometric relations corresponding to the selected page template; and (d) repeat (a), (b), and (c) and until the list of page template candidates is empty; and
output each identified page template to a memory.

19. The computer-based system of claim 18, wherein the page template matching module is further configured to:

identify pages in the document having a set of geometric relations that partially match the set of geometric relations corresponding to the selected page template.

20. The computer-based system of claim 18, further comprising a QA module configured to:
apply at least one correction to at least one identified page in the document based at least in part on the corresponding partially matching set of geometric relations of the selected page template.

\* \* \* \* \*